United States Patent
Makis et al.

(12)

(10) Patent No.: US 10,766,111 B2
(45) Date of Patent: Sep. 8, 2020

(54) LOADING AND/OR UNLOADING DEVICE AND METHOD FOR OPERATING A LOADING AND/OR UNLOADING DEVICE

(71) Applicant: SW AUTOMATION GMBH, Tettnang (DE)

(72) Inventors: Sven Makis, Langenargen (DE); Metin Kilic, Efrizweiler (DE)

(73) Assignee: SW AUTOMATION GMBH, Tettnang (DE)

( * ) Notice: Subject to any disclaimer, the term of this patent is extended or adjusted under 35 U.S.C. 154(b) by 0 days.

(21) Appl. No.: 16/354,302

(22) Filed: Mar. 15, 2019

(65) Prior Publication Data
US 2019/0291225 A1    Sep. 26, 2019

(30) Foreign Application Priority Data

Mar. 26, 2018 (DE) .................. 10 2018 107 194

(51) Int. Cl.
  *B23Q 7/04* (2006.01)
  *B25J 5/02* (2006.01)
  *B25J 9/00* (2006.01)

(52) U.S. Cl.
  CPC ............. *B23Q 7/04* (2013.01); *B25J 5/02* (2013.01); *B25J 9/0096* (2013.01)

(58) Field of Classification Search
  CPC ....... B25J 5/007; B25J 5/02; B25J 5/04; B25J 9/0096; B23Q 7/04; B65G 1/137
  See application file for complete search history.

(56) References Cited

U.S. PATENT DOCUMENTS

2004/0007140 A1*  1/2004  Irri ............................ B25J 5/02
                                                              100/94
2018/0065806 A1    3/2018  Sugahara et al.

FOREIGN PATENT DOCUMENTS

| DE | 102005009283 A1 | 8/2006 |
| EP | 0156953 A1 | 10/1985 |
| EP | 1380392 A2 | 1/2004 |
| JP | 07186968 | 7/1995 |
| JP | 09216180 | 8/1997 |

OTHER PUBLICATIONS

European Search Report in corresponding European Application No. 19159930, dated Aug. 6, 2019.
Extended European Search Report for corresponding European application No. 19159930, dated Aug. 6, 2019 and translation.

* cited by examiner

*Primary Examiner* — Saul Rodriguez
*Assistant Examiner* — Brendan P Tighe
(74) *Attorney, Agent, or Firm* — Bacon & Thomas, PLLC

(57) ABSTRACT

A mobile loading and/or unloading device with at least one transport unit for moving the loading and/or unloading device, with at least one storage unit fixed to the transport unit, on which at least one gripping object can be arranged or is arranged and with at least one on-the-transport-unit fixed manipulator unit. The manipulator unit includes at least one manipulator, which includes at least one gripping means for gripping the at least one gripping object through which the at least one gripping object can be arranged and/or removed in a processing station, such as a machine tool, and/or can be arranged in or on and/or removed from the storage unit. The storage unit includes at least one holding device by which the at least one gripping object can be fixed.

9 Claims, 3 Drawing Sheets

LOADING AND/OR UNLOADING DEVICE AND METHOD FOR OPERATING A LOADING AND/OR UNLOADING DEVICE

This application claims priority to German application DE 10 2018 107 194.9, filed Mar. 26, 2018, which is incorporated by reference.

The invention relates to a mobile loading and/or unloading device with at least one transport unit for moving the loading and/or unloading device, with at least one storage unit fixed to the transport unit, on which at least one gripping object can be arranged or is arranged and with at least one on-the-transport-unit fixed manipulator unit, which comprises at least one, in particular multi-axis, manipulator, which comprises at least one gripping means for gripping the at least one gripping object through which the at least one gripping object can be arranged and/or removed in a processing station, such as machine tool, and/or can be arranged in or on and/or removed from the storage unit, and a method for operating a loading and/or unloading device.

BACKGROUND

In processing systems in which a plurality of processing stations are provided, the workpieces intended for processing are supplied to the individual processing stations, for example by means of a gantry device.

A generic loading or unloading device is known from DE 10 2005 009 283 A1, (also published as WO 2006/089625) which is incorporated by reference herein, in which workpieces can be stored directly on the loading and/or unloading device on a storage unit and moved together with the manipulator.

When machining workpieces, the individual workpieces either pass through a plurality of processing steps at a processing station or are transported from one processing station to the next processing station for carrying out various processing steps by the loading and/or unloading device. A total duration of the machining of a workpiece is composed of the processing times in the processing station or in the processing stations and the travel times of the loading and/or unloading device.

SUMMARY OF THE INVENTION

The object of an embodiment of the invention is to reduce the total duration of machining a workpiece.

This object is achieved in a loading and/or unloading device mentioned above in that the storage unit comprises at least one holding means by which the at least one gripping object can be fixed against movement at least transversely or obliquely to the direction of travel of the loading and unloading device.

Characterized in that the storage unit comprises at least one holding means by which the at least one gripping object is fixed against moving at least transversely or obliquely to the direction of travel, slipping or shifting of the at least one gripping object in driving maneuvers with high acceleration forces, such as abrupt acceleration or braking, or with high centrifugal forces, for example when cornering, is reduced. As a result, transfer speeds can be increased and the total duration of machining a workpiece can be reduced.

The manipulator can be multiaxial. For example, it may comprise a 6-axis industrial robot. In addition, it is conceivable that the manipulator comprises a kinematics that allows degrees of freedom comparable to a 6-axis design.

The manipulator unit and/or the storage unit may be fixed directly to the transport unit or indirectly fixed to the transport unit.

The at least one holding means of the storage unit can be configured simply and inexpensively if the at least one holding means of the storage unit comprises a recess extending transversely or obliquely to the direction of travel, which in particular comprises a cross section which corresponds, in particular is complementary, to the cross section of the gripping object.

In this case, the at least one gripping object can be deposited by the manipulator of the manipulator unit in arranging the at least one gripping object in a puzzle-like manner on the storage unit.

In addition, it proves to be advantageous if the loading and/or unloading device comprises at least one clamping element by which the gripping object can be fixed against moving parallel, transversely and obliquely to the direction of travel, and/or if at least one of the at least one holding means includes the clamping element.

In this case, the at least one gripping object is fixed relative to the storage unit. This proves to be particularly advantageous if the loading and/or unloading device comprises at least one fixed-to-the-transport-unit processing unit, through which at least one fixed-to-the-clamping-element gripping object is machinable, in particular machined through cutting.

Characterized in that the gripping object is held by the clamping element, the processing unit can act with processing forces on the gripping object, without the gripping object being able to escape.

By providing a processing unit fixed to the transport unit, it is possible to process gripping objects during operation of the loading and/or unloading device. As a result, the processing times of gripping objects in processing plants can be further shortened.

In a further development of the latter embodiment, it proves to be advantageous if the machining unit comprises at least one tool by which the gripping object fixed on the clamping element can be machined, in particular if the at least one tool is a grinding tool, milling tool, drilling tool, turning tool, deburring tool, laser tool and/or embossing tool.

As a result, machining operations at the processing stations can be dispensed with, for example deburring or embossing, and instead can, preparatory or supplementary, take place simultaneously with the transfer of the gripping objects. As a result, processing times can be shortened.

In principle, it is conceivable that the gripping objects are transferred by the manipulator of the manipulator unit from the holding means to the clamping element. In one embodiment of the loading and/or unloading device, at least one handling means fixed to the transport unit is provided for at least transferring a gripping object from the holding means to the clamping element or from the clamping element to the holding means, and/or at least one control unit is provided comprising at least one sensor, such as a laser, a RFID communication device, a proximity sensor, a camera, and for controlling at least the handling means, the manipulator and/or the processing unit.

It is also conceivable that the manipulator comprises the handling means. In such case, the loading and/or unloading device is formable in a component-reducing and compact way. Furthermore, in addition to the manipulator, a further manipulator may be provided, which serves as a handling means.

Moreover, it proves to be advantageous if the transport unit is mobile in a guided way on a support and/or a rail of a processing system or if the transport unit comprises at least one unwind unit, such as wheel or chain, through which the loading and unloading device is freely mobile.

The transport unit may for example comprise a carriage which is slideable along a rail-like support of the processing plant. In such case, the loading and/or unloading device can be moved at the level of a floor or can be moved to the floor at a distance.

If the transport unit comprises at least one unwinding unit, such as wheel or chain, the loading and/or unloading device is free to move in a space.

Furthermore, in one embodiment of the loading and/or unloading device it is provided for that the transport unit comprises a transport means on which the manipulator unit, the storage unit, the processing unit, the handling means and control unit are directly or indirectly fixed and/or the transport unit has a first transport means, in which the manipulator unit is fixed directly or indirectly and at least one second transport means, which is detachably fixable or fixed on the first transport means, for example, by chain, latches, pins, etc., and to which the storage unit, the processing unit, the handling means and control unit are fixed directly or indirectly.

If the transport unit comprises only a single means of transport, the loading and/or unloading device can be made compact. If the loading and/or unloading device comprises a first transport means and a second transport means, conventional loading and/or unloading devices are modular and can be retrofitted in a simple manner. In addition, the loading and/or unloading device may also comprise only the first transport means with the manipulator unit arranged thereon, if an intermediate storage or a parallel processing of gripping objects is not required.

Finally, it proves to be advantageous if the gripping object comprises a workpiece, a tool and/or a gripping means of the manipulator.

In this case, the gripping object may comprise not only workpieces which are transferred by the manipulator of the manipulator unit to the respective processing station, but also tools, for example for the handling unit or for the processing stations and a gripping means for the manipulator of the manipulator unit. As a result, travel times can be reduced, in which the loading and/or unloading would have to be converted for certain jobs.

In addition, the object is achieved by a method for operating a loading and/or unloading device, in particular with at least one of the aforementioned features, which comprises at least one transport unit, the at least one fixed-to-the-transport-unit manipulator unit and the at least one fixed-to-the-transport-unit storage unit, with the following steps:
a. Arranging at least one gripping object on or at the storage unit, in particular in or on the at least one recess of the storage unit, by the manipulator unit and/or by a handling means;
b. Possible method of loading and/or unloading device, in particular to a processing station, such as machine tool;
c. Arranging and/or removing at least one gripping object in the processing station;
d. Transferring at least one gripping object from the holding means to a clamping element by the manipulator unit and/or by the handling means and fixing the gripping object in the clamping element;
e. Processing the gripping object fixed in the clamping element by a processing unit; and
f. Transferring at least one processed gripping object from the clamping element to the holding means.

Further features, details and advantages of the invention will become apparent from the appended patent claims, from the drawings and the following description of a preferred embodiment of the loading and/or unloading device and the method.

BRIEF DESCRIPTION OF THE DRAWINGS

The drawing shows.

DETAILED DESCRIPTION OF THE INVENTION

Figure 1:
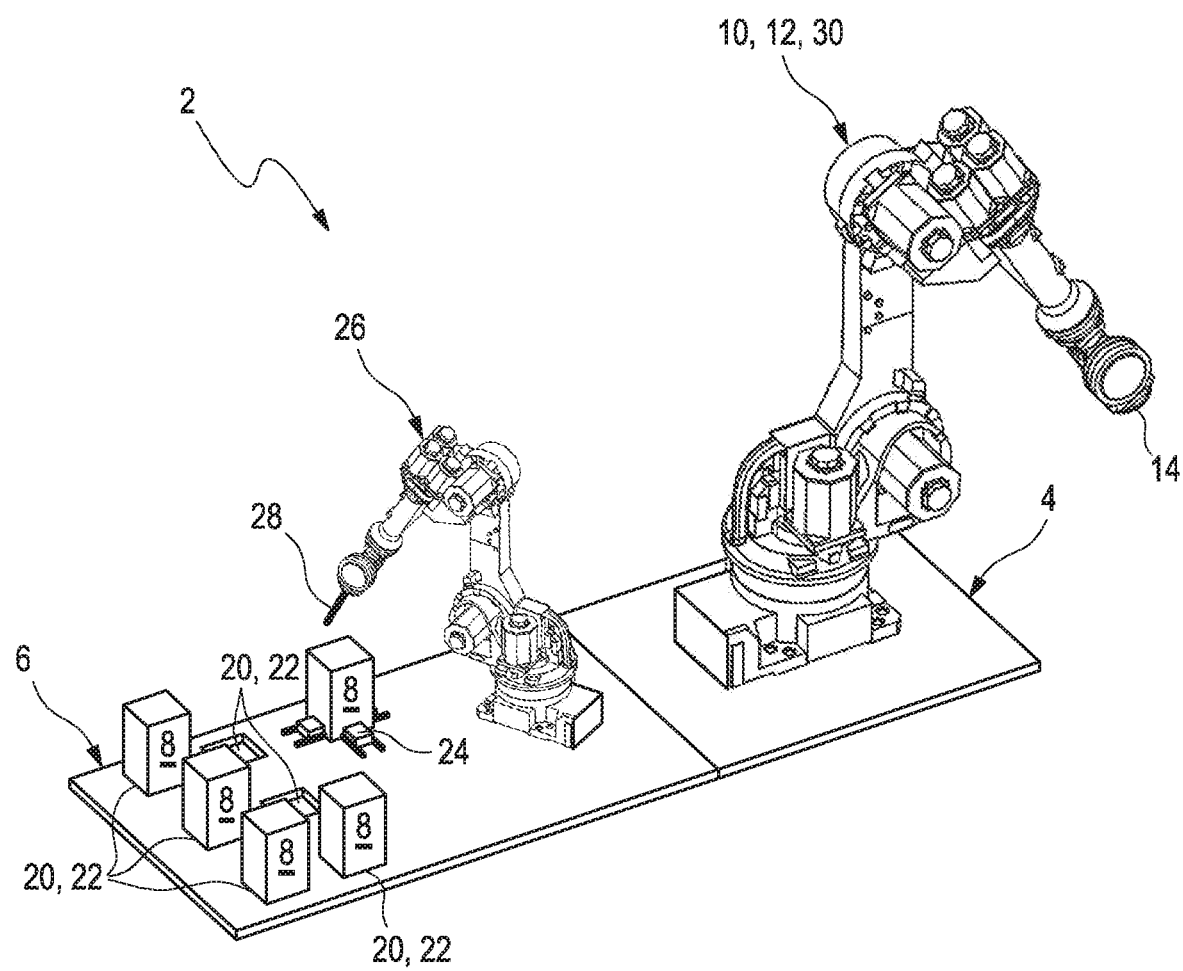
FIG. 1 A perspective side view of an embodiment of a loading and/or unloading device.
Figure 2:
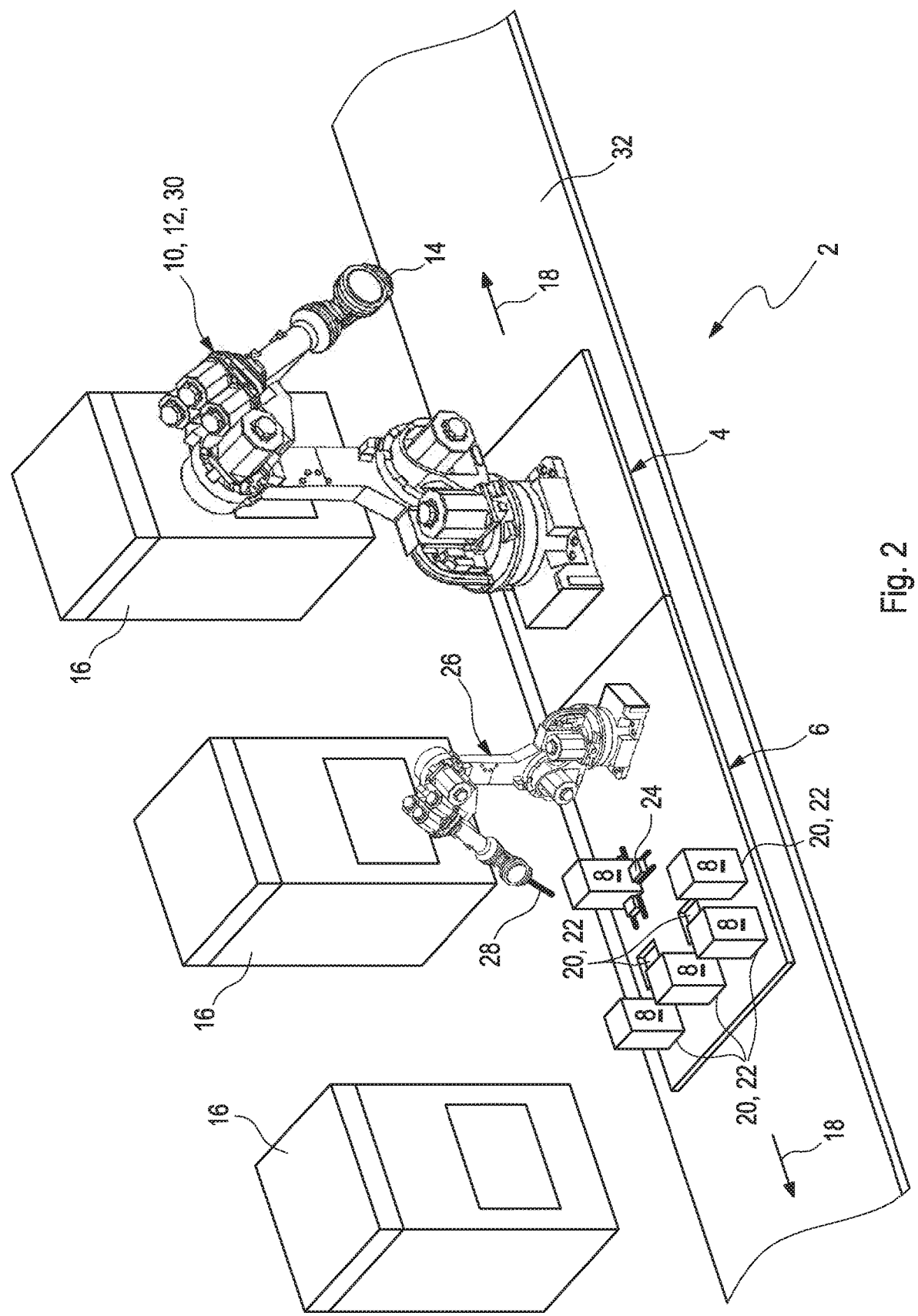
FIG. 2 A schematic side perspective view of the embodiment of FIG. 1 in a processing system.

FIG. 1 shows a first embodiment of loading and/or unloading provided overall with the reference numeral 2. The loading and/or unloading device 2 comprises a transport unit 4 for moving the loading and/or unloading device 2. FIG. 2 shows the loading and/or unloading device 2, in which the transport unit 4 can be moved along a carrier 32, such as rails or a conveyor system.

In addition, the loading and/or unloading device 2 comprises a storage unit 6, which can be fixed to the transport unit 4. On the storage unit 6 at least one gripping object 8 can be arranged.

In addition, the loading and/or unloading device 2 comprises a manipulator unit 10 which can be fixed to the transport unit 4 and which comprises at least one manipulator 12. By means of the manipulator 12 of the manipulator unit 10 by means of a gripping means 14 of the manipulator 12 at least one of the gripping objects 8 is grippable and can be fed to or removed from a processing station 16 (FIG. 2) or the storage unit 6. The gripping means 14 of the manipulator 12 includes, but not limited to, having two or more gripping elements that are spring, hydraulically, or pneumatically operated, suction cups, or magnets for grasping a gripping object.

In order to prevent moving the gripping objects 8 transversely or obliquely to a direction of travel 18, the storage unit 6 comprises at least one holding means 20.

In the embodiment of the loading and/or unloading device 2 shown in the figures, the holding means 20 comprises a recess 22 in which a gripping object 8 can be arranged.

In addition, the loading and/or unloading device 2 comprises a clamping element 24, such as spring-loaded, pneumatic, or slotted clamps or blocks, by means of which the gripping object 8 can be secured against movement parallel, transversely or obliquely to the direction of travel 18. In addition, the loading and/or unloading device 2 comprises a processing unit 26 which is fixed to the transport unit 4. By the processing unit 26, a gripping object 8 held by the clamping element 24 can be processed. The processing unit 26 may comprise a tool 28, for example, a grinding tool, milling tool, drilling tool, turning tool, deburring tool and/or embossing tool. As a result, the gripping objects 8 can be processed during operation of the loading and/or unloading device 2.

In order to arrange the gripping objects 8 in or on the clamping element 24, the loading and/or unloading device comprises a handling means 30, which is fixed to the transport unit 4. By the handling means 30, a gripping object 8 can be taken over by the holding means 20 and transferred to the clamping element 24 and fixed there or removed from the clamping element 24 and again arranged on the holding means 20.

Figure 3:
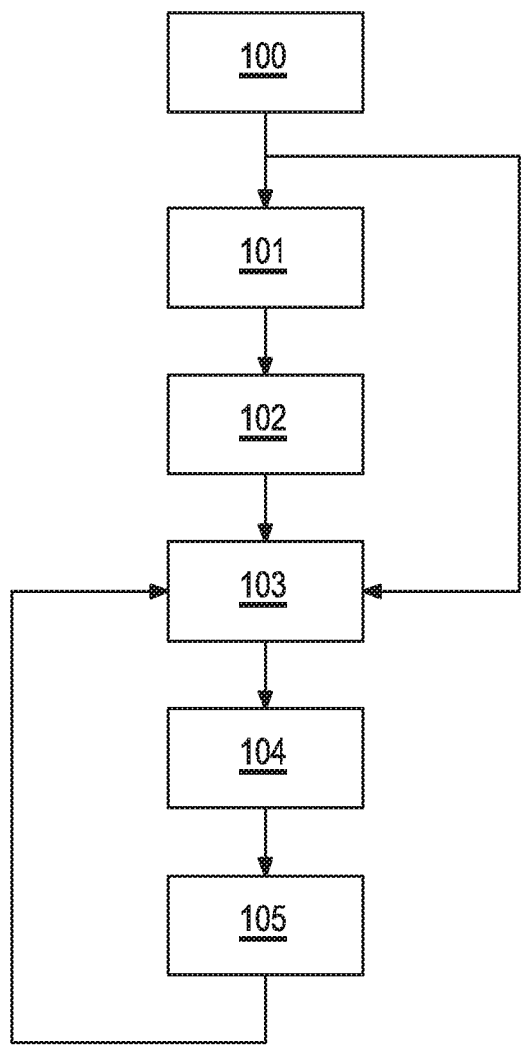
FIG. 3 A schematic flow diagram of a method according to the invention.

In the embodiment shown in the figures, the handling means 30 is formed by the manipulator 12 of the manipulator unit 10. With reference to FIG. 3 with the aid of FIGS. 1 and 2, a method for operating the loading and/or unloading device 2 is described:

In a first step 100, at least one gripping object 8 is arranged in or on the recess 22 of the depositing unit 6 by the manipulator 12 of the manipulator unit 10. In a possibly following step 101, the loading and/or unloading device 2 is moved to a processing station 16. In addition, it is conceivable that in step 101 the loading and/or unloading device 2 is moved from one processing station 16 to another processing station 16.

Upon reaching a processing station 16, at least one gripping object 8 is arranged in the processing station 16 by means of the manipulator 12 of the manipulator unit 10. In addition, in a step 102, a gripping object 8 can also be removed from the processing station 16 by the manipulator 12 of the manipulator unit 10 and arranged on the storage unit 6. Parallel to steps 100 to 102 or following steps 100 to 102, at least one gripping object 8, which is arranged in a holding means 20 of the depositing unit 6, can be transferred by the handling means 30 from the holding means 20 to the clamping element 24. In the clamping element 24, the gripping object 8 is fixed against moving.

After that, in a step 104, the gripping object 8 is processed by the processing unit 26. After finishing the processing of the gripping object 8 by the processing unit 26, the gripping object 8 is removed by the handling means 30 from the clamping element 24 and arranged on the holding means 20 of the transport unit 4. Immediately thereafter, the handling means 30 can remove a hitherto unprocessed gripping object 8 from a holding means 20 in the transport unit 4 and arrange it on the clamping element 24 in order to have it processed there by the processing unit 26.

The features of the invention disclosed in the foregoing description, in the patent claims and in the drawing, may be essential both individually and in any combination in the realization of the invention in its various embodiments.

REFERENCE LIST

2 loading and/or unloading device
4 transport unit
6 storage unit
8 gripping object
10 manipulator unit
12 manipulator
14 gripping means
16 processing station
18 travel direction
20 holding means
22 recess
24 clamping element
26 processing unit
28 tool
30 handling means
32 carrier

The invention claimed is:

1. A mobile loading and/or unloading device comprising:
at least one transport unit for moving the loading and/or unloading device;
at least one storage unit fixed to the transport unit, on which at least one gripping object is able to be arranged or is arranged; and
at least one on-the-transport-unit fixed manipulator unit, said fixed manipulator unit comprising at least one manipulator, which comprises at least one gripping means for gripping the at least one gripping object through which the at least one gripping object is able to be arranged and/or removed in a processing station and/or is able to be arranged in or on and/or removed from the storage unit,
wherein the storage unit comprises at least one holding means by which the at least one gripping object is able to be fixed against moving at least transversely or obliquely to a direction of travel of the loading and unloading device,
further comprising at least one clamping element, by which the at least one gripping object is able to be fixed against movement parallel, transversely and obliquely to the direction of travel; and
at least one processing unit fixed to the at least one transport unit, by which the at least one gripping object fixed to the at least one clamping element is able to be machined on the at least one transport unit.

2. The mobile loading and/or unloading device according to claim 1, wherein the at least one holding means of the storage unit comprises a transversely or obliquely to the direction of travel extending recess, which in particular comprises a cross section which corresponds to a cross-section of the gripping object.

3. The mobile loading and/or unloading device according to claim 1, wherein at least one of the at least one holding means comprises the clamping element.

4. The mobile loading and/or unloading device according to claim 3, further comprising at least one handling means fixed to the transport unit for at least transferring the at least one gripping object from the holding means to the clamping element or from the clamping element to the holding means and/or by at least one control unit comprising at least one sensor means for controlling at least the handling means, the manipulator and/or the processing unit.

5. The mobile loading and/or unloading device according to claim 1, wherein the transport unit is guided on a carrier and/or rail of a processing system or that the transport unit comprises at least one unwinding unit by which the loading and unloading device is freely mobile.

6. The mobile loading and/or unloading device according to claim 1, wherein the transport unit comprises a transport means on which the manipulator unit, the storage unit, the processing unit, the handling means and control unit are directly or indirectly fixed and/or that the transport unit is a first transport means, to which the manipulator unit is directly or indirectly fixed and at least one second transport means, which is detachably fixed or fixed to the first transport means and on which the storage unit, the processing unit, the handling means and control unit are fixed directly or indirectly.

7. The mobile loading and/or unloading device according to claim 1, wherein the gripping object comprises at least one of a workpiece, a tool and/or a gripping means of the manipulator.

8. A mobile loading and/or unloading device comprising:
at least one transport unit for moving the loading and/or unloading device;
at least one storage unit fixed to the transport unit, on which at least one gripping object is able to be arranged or is arranged; and at least one on-the-transport-unit fixed manipulator unit, said fixed manipulator unit comprising at least one manipulator, which comprises at least one gripping means for gripping the at least one gripping object through which the at least one gripping object is able to be arranged and/or removed in a processing station and/or is able to be arranged in or on and/or removed from the storage unit, wherein the storage unit comprises at least one holding means by which the at least one gripping object is able to be fixed against moving at least transversely or obliquely to a direction of travel of the loading and unloading device, further comprising at least one clamping element, by which the at least one gripping object is able to be fixed against movement parallel, transversely and obliquely to the direction of travel; and at least one processing unit fixed to the at least one transport unit, by which the at least one gripping object fixed to the at least one clamping element is able to be processed, wherein the processing unit comprises at least one tool, by which the gripping object fixed on the clamping element is machinable, wherein the at least one tool comprises at least one of a grinding tool, milling tool, drilling tool, turning tool, deburring tool, laser tool and an embossing tool.

9. A method for operating a loading and/or unloading device comprising at least one transport unit, at least one manipulator unit fixed to the transport unit and the at least one storage unit fixed to the transport unit, comprising the steps:

arranging at least one gripping object on or at the storage unit, in particular in or on at least one recess of the storage unit by the at least one manipulator unit and/or by a handling means;

arranging and/or removing the at least one gripping object in a processing station by the loading and/or unloading device;

transferring the at least one gripping object from holding means to a clamping element by the manipulator unit and/or by the handling means and fixing the at least one gripping object in the clamping element;

processing the at least one gripping object fixed in the clamping element by machining the at least one gripping object on the at least one transport unit by a processing unit fixed to the at least one transport unit; and transferring the at least one processed gripping object from the clamping element to the holding means, wherein at least one clamping element is used by which the at least one gripping object is able to be fixed against movement parallel, transversely and obliquely to the direction of travel.

* * * * *